S. HUTCHINSON.
Gang Plow.
No. 56,942
Patented Aug. 7, 1866.
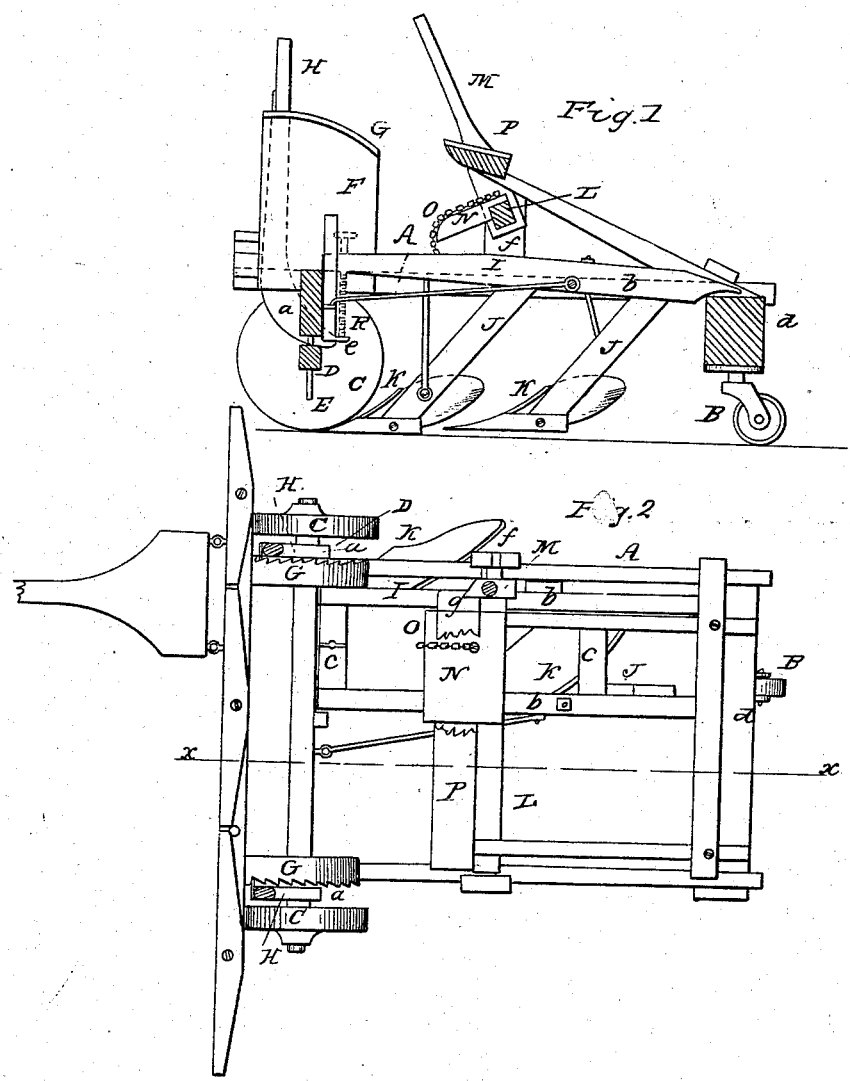

UNITED STATES PATENT OFFICE.

SAMUEL HUTCHINSON, OF GRIGGSVILLE, ILLINOIS.

IMPROVEMENT IN GANG-PLOWS.

Specification forming part of Letters Patent No. 56,942, dated August 7, 1866.

*To all whom it may concern:*

Be it known that I, SAMUEL HUTCHINSON, of Griggsville, in the county of Pike and State of Illinois, have invented a new and Improved Gang-Plow; and I do hereby declare that the following is a full, clear, and exact description thereof, which will enable others skilled in the art to make and use the same, reference being had to the accompanying drawings, forming a part of this specification, in which—

Figure 1 is a side sectional view of my invention, taken in the line $x\,x$, Fig. 2; Fig. 2, a plan or top view of the same.

Similar letters of reference indicate like parts.

This invention relates to a new and improved means for regulating the depth of the penetration of the plows, and also to a means for raising and lowering the plows and retaining them in the ground when the device is at work, as hereinafter fully shown and described.

A represents the frame of the machine, which is of rectangular form, and is supported at its rear end by a caster-wheel, B, and by two wheels, C C, at its front end. The axle D of the wheels C C has two holes made through it for pendent guide-rods E E, at the front end of frame A, to pass loosely through, and to each side of the front part of the frame A there is attached an upright slab or board, F, the upper ends of which are rounded to form a portion of a circle and have metal toothed racks G permanently secured to them.

To each side of the front part of the frame A there is also attached a lever, H, and the lower ends of these levers are curved in segment form, as shown at $a$ in Fig. 1, and these segment portions $a$ rest or bear upon the axle D, and it will be seen that by adjusting the levers H the front part of the frame A may be raised or lowered, either horizontally, or one side raised higher than the other, and the frame retained in the position desired by having the upper parts of the levers H engage with the racks G. This adjustment of the frame A is designed to regulate the depth of the penetration of the plows in the earth.

I represents a frame composed of two parallel bars, $b\,b$, connected by bars $c$. This frame I has two standards, J J, attached to it, with plows K K at their lower ends. The ends of the frame I rest loosely in frame A, the back end of I resting upon the rear cross-piece, $d$, of A, and the front end resting upon cleats $e$ when I is fully down.

L is a horizontal shaft, the ends of which are fitted in bearings $ff$ at the sides of frame A. This shaft has a lever, M, at one end of it, and has a plate, N, projecting from it, which plate is directly over the frame I, and a chain, O, is attached to the inner end of N and to frame I.

P is the driver's seat, attached to supports Q Q, which are secured to the rear part of frame A, and by drawing back the lever M the front part of frame I will be raised, and consequently the plows K, and the plows may be retained in an elevated position by adjusting the lever in a notch in a plate, $g$, at one end of the driver's seat.

When the plow-frame I is depressed the plate N of shaft L bears upon it and holds the frame I down, and the plows are retained in the ground.

I design, in practice, to have a gage-screw, R, (shown in red,) pass vertically through the front part of the frame I, to regulate the depth of the penetration of the plows.

The draft-pole I design to have attached to the front end of the frame A in such a manner that it may be adjusted laterally in order to give the plows more or less land and to admit of three horses being driven abreast. This, however, has been previously done with similar or analogous machines.

The advantage of the invention consists in the facility with which the depth of the penetration of the plows may be regulated and the holding of the plows in the ground.

Having thus described my invention, I claim as new and desire to secure by Letters Patent—

1. The elevating or adjusting of the frame A of the machine in a vertical direction, in order to regulate the depth of the penetration of the plows, by means of the levers H H, provided with lower segment ends, $a$, and secured to the sides of frame A, in combination with the pendent pins E E, attached to frame A, and passing loosely through the axle D, substantially as shown and described.

2. The plow-frame I, fitted within the frame A, and connected by a chain, O, with a plate, N, attached to a shaft, L, over frame I, whereby the plow-frame and plows may be raised, when desired, and the plows, when at work, retained in the ground, substantially as set forth.

The above specification of my invention signed by me this 22th day of December, 1865.

SAMUEL HUTCHINSON.

Witnesses:
 WILLIAM DONOVAN,
 JOHN E. HIGDON.